US009880658B2

(12) United States Patent
Xi et al.

(10) Patent No.: US 9,880,658 B2
(45) Date of Patent: Jan. 30, 2018

(54) ARRAY SUBSTRATE, DISPLAY PANEL AND ELECTRONIC DEVICE

(71) Applicants: Shanghai AVIC Optoelectronics Co., Ltd., Shanghai (CN); Tianma Micro-Electronics Co., Ltd., Shenzhen (CN)

(72) Inventors: Kerui Xi, Shanghai (CN); Tingting Cui, Shanghai (CN)

(73) Assignees: SHANGHAI AVIC OPTO ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 14/949,811

(22) Filed: Nov. 23, 2015

(65) Prior Publication Data
US 2016/0291777 A1 Oct. 6, 2016

(30) Foreign Application Priority Data

Apr. 1, 2015 (CN) .......................... 2015 1 0152686

(51) Int. Cl.
*G06F 3/041* (2006.01)
*G06F 3/044* (2006.01)
(Continued)

(52) U.S. Cl.
CPC ............ *G06F 3/0416* (2013.01); *G06F 3/041* (2013.01); *G06F 3/044* (2013.01); *G06F 3/0412* (2013.01);
(Continued)

(58) Field of Classification Search
CPC ...... G06F 3/044; G06F 3/0412; G06F 3/0416; G06F 2203/04111; G06F 2203/04105;
(Continued)

(56) References Cited

U.S. PATENT DOCUMENTS 8,305,361 B2* 11/2012 Yang ...................... G06F 3/044
178/18.01
8,390,582 B2* 3/2013 Hotelling .............. G06F 3/0412
345/173

(Continued)

*Primary Examiner* — Dismery Mercedes
(74) *Attorney, Agent, or Firm* — Alston & Bird LLP (57) ABSTRACT

Array substrate, display panel and electronic device are provided. The array substrate includes: a touch control circuit including first switches, second switches and a first control module; and touch control electrodes arranged in array and insulated from one another, wherein adjacent touch corresponding control electrodes are connected with each other through first switch, each touch control electrode is connected with signal line through second switch, when the array substrate is in touch control detection state, the first control module turns off first switches connecting to touch control electrodes in a particular row, and turns on second switches connecting to touch control electrodes in the particular row, such that touch control electrodes in the particular row are disconnected from other ones and electrically connected to signal line; and repeat above processing row by row. Detection signal lines are saved, wiring is simplified, space for wiring is saved, and cost is reduced.

20 Claims, 9 Drawing Sheets

(51) Int. Cl.
  *G02F 1/1333* (2006.01)
  *G09G 3/36* (2006.01)
  *G02F 1/1362* (2006.01)

(52) U.S. Cl.
  CPC .... *G02F 1/13338* (2013.01); *G02F 1/136286* (2013.01); *G09G 3/3677* (2013.01); *G09G 2300/0426* (2013.01)

(58) Field of Classification Search
  CPC . G06F 2203/04106; G06F 2203/04112; G02F 1/13338; G02F 1/136286; G02F 1/1368; G09G 2300/0426; G09G 3/3677; G09G 3/3648
  See application file for complete search history.

(56) References Cited

U.S. PATENT DOCUMENTS

| | | | | |
|---|---|---|---|---|
| 8,427,435 B2* | 4/2013 | Takahashi | ............. | G06F 3/0416 345/173 |
| 9,513,754 B2* | 12/2016 | Katsuta | ................... | G06F 3/044 |
| 9,703,440 B2* | 7/2017 | Li | ............................ | G06F 3/044 |
| 9,740,355 B2* | 8/2017 | Li | ............................ | G06F 3/044 |
| 2009/0058825 A1* | 3/2009 | Choi | ..................... | G06F 3/0412 345/173 |
| 2009/0091552 A1* | 4/2009 | Lee | ......................... | G06F 3/044 345/174 |
| 2009/0115735 A1* | 5/2009 | Chuang | ............... | G02F 1/13338 345/173 |
| 2009/0273578 A1* | 11/2009 | Kanda | ..................... | G06F 3/044 345/174 |
| 2010/0039406 A1* | 2/2010 | Lee | ..................... | G02F 1/13338 345/174 |
| 2011/0141035 A1* | 6/2011 | Hung | ..................... | G06F 3/045 345/173 |
| 2012/0056835 A1* | 3/2012 | Choo | .................... | G06F 3/0412 345/173 |
| 2012/0120020 A1* | 5/2012 | Lee | ........................ | G06F 3/0412 345/174 |
| 2012/0169660 A1* | 7/2012 | Seo | ........................ | G06F 1/3262 345/174 |
| 2013/0342500 A1* | 12/2013 | Huang | .................. | G06F 3/0416 345/174 |
| 2014/0132560 A1* | 5/2014 | Huang | ................... | G06F 3/041 345/174 |
| 2015/0205428 A1* | 7/2015 | Wang | ..................... | G06F 3/044 345/174 |
| 2015/0317023 A1* | 11/2015 | Wei | ......................... | G06F 3/044 345/174 |
| 2015/0378471 A1* | 12/2015 | Liu | ......................... | G06F 3/044 345/174 |
| 2016/0041664 A1* | 2/2016 | Qin | ........................ | G06F 3/044 345/173 |
| 2016/0202790 A1* | 7/2016 | Yang | ..................... | G06F 3/0412 345/174 |

* cited by examiner

ARRAY SUBSTRATE, DISPLAY PANEL AND ELECTRONIC DEVICE

CROSS-REFERENCE TO RELATED APPLICATIONS

The present application claims priority to Chinese patent application No. 201510152686.0, filed on Apr. 1, 2015 with the People's Republic of China, and entitled "ARRAY SUBSTRATE, DISPLAY PANEL AND ELECTRONIC DEVICE", and the entire disclosure of which is incorporated herein by reference.

FIELD OF THE DISCLOSURE

The present disclosure generally relates to liquid crystal display technology, and more particularly, to an array substrate, a display panel and an electronic device.

BACKGROUND OF THE DISCLOSURE

Figure 1:
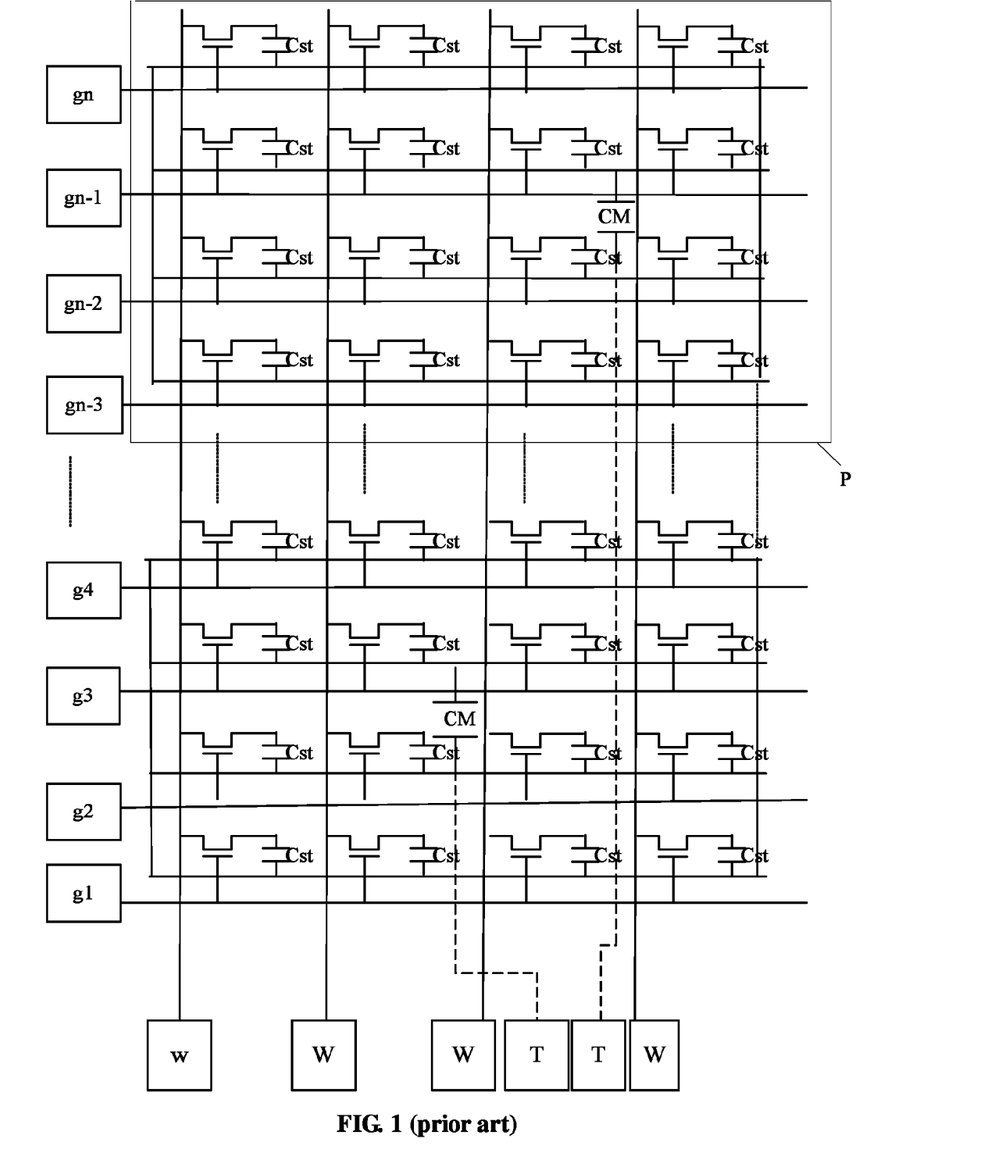
FIG. 1 schematically illustrates an equivalent circuit diagram of an array substrate which has a touch control function utilizing existing techniques.

FIG. 1 schematically illustrates a known circuit diagram of an array substrate for touch control functionality.

In the existing techniques, a common electrode layer is divided into a plurality of independent units each of which serves as a touch control electrode P.

In FIG. 1, except for dotted lines connected with touch control detection terminals T, elements in FIG. 1 constitute an equivalent circuit diagram of a liquid crystal display device. Each touch control electrode P in the equivalent circuit includes a plurality of Thin Film Transistors (TFTs).

Referring to FIG. 1, impulse signals g1 to gn are connected to corresponding scanning lines. Each scanning line connects gates of TFTs in a plurality of sub pixels in one row. The scanning lines are configured to turn on or turn off the TFTs of the sub pixels.

Data input terminals W are connected to corresponding signal lines which are arranged in columns. Each signal line connects drains or sources of TFTs of a plurality of sub pixels in one column The signal lines are configured to transmit signals to pixel electrodes of the sub pixels.

Capacitance Cst represents the equivalent capacitance of an electric potential of a common electrode (i.e., COM electric potential) and other electric potentials.

In the existing techniques, touch control function and display function are integrated by dividing the common electrode layer into a plurality of independent units. Specifically, each touch control electrode P corresponds to a detection capacitance CM and a detection signal line (represented by a dotted line) connected with the detection capacitance CM. A touch control detection terminal T detects the variation of the detection capacitance CM to determine a touched region. The above-mentioned detection method is widely adopted and is referred to as the self-cap touch control method.

However, in the self-cap touch control method, to realize signal detection, a plurality of detection capacitances CM are required in the whole array substrate, and each detection capacitance CM needs to be connected with a detection signal line. As a result, wiring density and production processes are increased. When a large size of a display panel or high-accuracy touch control is required, the number of detection signals connected with detection capacitances may be relatively great, which makes the wiring of the display panel more difficult. In addition, the detection capacitances vary from one another. Therefore, it is difficult to obtain a display panel having a large size or a display panel having high accuracy in touch control.

BRIEF SUMMARY OF THE DISCLOSURE

Embodiments of the present disclosure provide an array substrate, a display panel and an electronic device. The display panel may have a relatively large size and relatively high accuracy in touch control.

In an embodiment of the present disclosure, an array substrate is provided, including: a touch control circuit which includes a plurality of first switches, a plurality of second switches and a first control module; and a plurality of touch control electrodes arranged in array and insulated from one another, wherein each two adjacent touch control electrodes are connected with each other through one first switch, each touch control electrode is connected with a signal line through one second switch, and when the array substrate is in a touch control detection state, the first control module is configured to: turn off the first switches connecting to the touch control electrodes in a particular row, and turn on the second switches connecting to the touch control electrodes in the particular row, such that each of the touch control electrodes in the particular row is disconnected from any other touch control electrode of the array substrate and is electrically connected to the corresponding signal line, and touch detection is realized for the particular row; and repeat the above processing row by row.

In an embodiment of the present disclosure, a display panel including the above array substrate is provided.

In an embodiment of the present disclosure, an electronic device including the above display panel is provided.

Compared with the techniques, embodiments of the present disclosure may have following advantages. The first switch is disposed between two adjacent touch control electrodes, and the second switch is disposed between each touch control electrode and the signal line. When the array substrate is in a touch control detection state, the touch control electrodes in a particular row are disconnected from adjacent touch control electrodes by turning off the first switches connecting to the touch control electrodes in the particular row, and the touch control electrodes in all the rows may experience this process. A touched region is detected based on a signal on the signal line. The array substrate provided in the embodiments of the present disclosure may save a great number of detection signal lines, which simplifies the wiring of circuit, saves a space for wiring, and reduces cost.

BRIEF DESCRIPTION OF THE DRAWINGS

In order to clarify the objects, characteristics and advantages of the disclosure and related art, embodiments of present disclosure will be described in detail in conjunction with accompanying drawings of both the disclosure and related art. The drawings are just examples and do not limit the scope of the disclosure, and other drawings may be obtained by a person skilled in the art based on these drawings without creative work.

DETAILED DESCRIPTION OF THE DISCLOSURE

Embodiments of present disclosure will be described clearly in detail in conjunction with accompanying drawings. The embodiments below are only examples of various embodiments, and there are many other possible embodiments. Based on the embodiments below, all the other embodiments obtained by those skilled in the art without any creative efforts should belong to the scope of the present disclosure.

In order to clarify the objects, characteristics, and advantages of the disclosure, embodiments of present disclosure will be described in detail in conjunction with accompanying drawings.

Figure 2A:
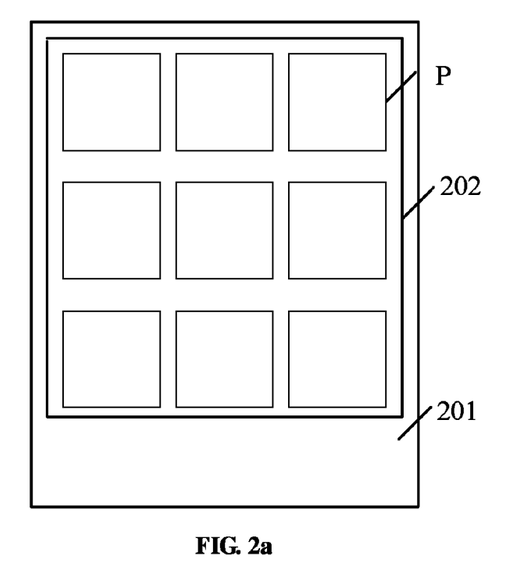
FIG. 2a schematically illustrates a diagram of an array substrate according to an embodiment of the present disclosure.

FIG. 2*a* schematically illustrates a diagram of an array substrate according to an embodiment of the present disclosure.

The array substrate includes a display region 202 and a non-display region 201. The array substrate further includes a touch control circuit (not shown in FIG. 2*a*) and a plurality of touch control electrodes P arranged in array, which are disposed in the display region 202. In some embodiments, the touch control circuit may be disposed in the display region 202, which is not limited in embodiments of the present disclosure.

The display region 202 may include a plurality of touch control electrodes P. Generally, a common electrode is divided into a plurality of independent units which are insulated from one another, each independent unit serving as a touch control electrode. In FIG. 2*a*, the touch control electrodes P are disposed in three rows and three columns It should be noted that, the touch control electrodes P may be disposed in n rows and m columns, where n and m are positive integers.

Figure 2B:
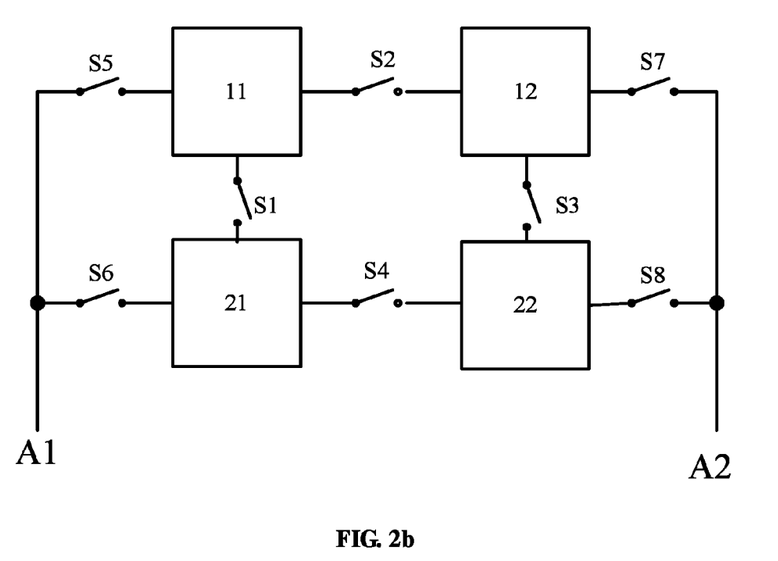
FIG. 2*b* schematically illustrates a diagram of an array substrate according to an embodiment of the present disclosure.

For those skilled in the art better understanding the present disclosure, working principles of the array substrate are described in conjunction with relations between four touch control electrodes shown in FIG. 2*b*.

It can be understood that each touch control electrode includes a plurality of pixel electrodes. In some embodiments, each touch control electrode P includes N pixel electrodes, where N is a positive integer.

In some embodiments, the touch control electrodes P are insulated from one another. The touch control circuit includes a plurality of first switches, a plurality of second switches and a first control module. Each two adjacent touch control electrodes are connected with each other through one first switch, and each touch control electrode is connected with a signal line through one second switch. When the array substrate is in a touch control detection state, the first control module is configured to: turn off the first switches connecting to the touch control electrodes in a particular row, and turn on the second switches connecting to the touch control electrodes in the particular row, such that each of the touch control electrodes in the particular row are disconnected from any other touch control electrode of the array substrate and is electrically connected to the corresponding signal line, and touch detection is realized for the particular row; and repeat the above processing row by row.

Referring to FIG. 2*b*, four touch control electrodes are illustrated for example, including a first touch control electrode 11, a second touch control electrode 12, a third touch control electrode 21 and a fourth touch control electrode 22.

The first touch control electrode 11 is electrically connected with the second touch control electrode 12 through a first switch S2.

The first touch control electrode 11 is electrically connected with the third touch control electrode 21 through a first switch S1.

The second touch control electrode 12 is electrically connected with the fourth touch control electrode 22 through a first switch S3.

The third touch control electrode 21 is electrically connected with the fourth touch control electrode 22 through a first switch S4.

The first touch control electrode 11 is electrically connected with a first signal line A1 through a second switch S5.

The second touch control electrode 12 is electrically connected with a second signal line A2 through a second switch S7.

The third touch control electrode 21 is electrically connected with the first signal line A1 through a second switch S6.

The fourth touch control electrode 22 is electrically connected with the second signal line A2 through a second switch S8.

It should be noted that, the touch control electrodes in one column are connected with a same signal line.

It should be noted that, each two adjacent touch control electrodes means two touch control electrodes adjacent in a same row or two touch control electrodes adjacent in a same column, not including two touch control electrodes adjacent in a diagonal direction.

It should be noted that, the first switches and the second switches may be the same type of switches or different types.

Those skilled in the art can understand, when touch control detection is required, scanning is performed row by row, to make touch control electrodes in a particular row be disconnected from adjacent touch control electrodes at a time, and the second switches in the particular row be in an on-state, thus, the capacitance variation in the independent touch control electrodes can be transmitted to a detection terminal through the signal line to be detected.

Figure 3:
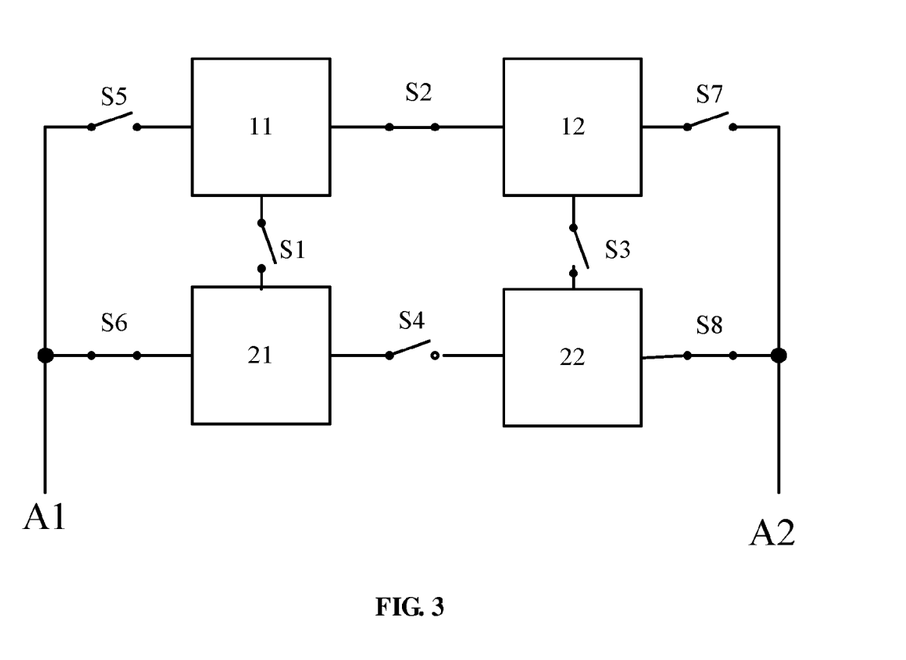
FIG. 3 schematically illustrates a diagram of the array substrate in FIG. 2*b* when touch control electrodes in a second row are in a touch control detection state.

For example, when touch control detection is performed to the touch control electrodes in the second row, the touch control electrodes in the second row need to be disconnected from those in the first row, and each two adjacent touch control electrodes in the second row need to be disconnected from each other as well. Referring to FIG. 2b, the touch control electrode 21 needs to be disconnected from the touch control electrode 11, the touch control electrode 22 needs to be disconnected from the touch control electrode 12, and the touch control electrode 21 needs to be disconnected from the touch control electrode 22. Meanwhile, the second switch S6 between the touch control electrode 21 and the signal line A1, and the second switch S8 between the touch control electrode 22 and the signal line A2 need to be turned on. The corresponding state is illustrated in FIG. 3.

In this way, touch control detection of the touch control electrodes in the second row is completed. Similarly, touch control detection of the touch control electrodes may be performed row by row, to make the touch control electrodes in all the rows experience the touch control detection.

It should be noted that, the detection of the touch control electrodes row by row is not performed in a certain order. In some embodiments, the touch control electrodes may be detected in interleaved rows. For example, after touch control detection is performed to the touch control electrodes in the second row, touch control detection may be performed to touch control electrodes in the fourth row, and then touch control detection is performed to touch control electrodes in the third row. In embodiments of the present disclosure, the touch control detection is performed to all the touch control electrodes in one row at a time, and further performed row by row, where the order of the rows is not limited. It should be noted that, row by row does not mean row by row successively. The order of rows to be detected is not limited, as long as the touch control electrodes in all the rows are performed with touch control detection.

It should be noted that, when the touch control detection is performed to touch control electrodes in a particular row, the touch electrodes in the particular row needs to be disconnected from one another, while the touch control electrodes in other rows may be electrically connected, and the touch control electrodes in the other rows may be connected to a reference electric potential of the array substrate through signal lines. The reference electric potential is generally a common potential of a common electrode. In this way, the array substrate can be in a display retaining state. Referring to FIG. 3, when the touch control electrodes in the second row are detected, the touch control electrodes in the first row can be electrically connected to one another. However, the switches S5 and S7 between the touch control electrodes in the first row and the signal lines A1 and A2 need to be turned off.

In the array substrate provided in the embodiments of the present disclosure, the first switches are set between two adjacent touch control electrodes, and the second switches are set between the touch control electrodes and the signal lines. When the array substrate is in a touch control detection state, each two adjacent touch control electrodes in a particular row are disconnected from adjacent touch control electrodes at a time by turning off the first switches in the particular row, and all the touch control electrodes experience this process row by row. A touched region is detected based on a signal on the signal lines. The array substrate provided in the embodiments of the present disclosure may save a great number of detection signal lines, which simplifies the wiring of circuit, saves a space for wiring, and reduces cost.

In some embodiments, functions of the signal lines may be realized by using data lines which are commonly adapted for transmitting display data to sub pixels. In existing techniques, an extra metal layer is required for forming detection signal lines. By using such embodiments, there is no need to form the extra metal layer, as the data lines can also serve as the signal lines. Therefore, materials may be saved and manufacturing processes may be improved.

In some embodiments, the common electric potential is divided into a plurality of electric potentials by the plurality of switches. The plurality of electric potentials are electrically connected or disconnected by the switches. In this way, time division self-cap detection for touch control signals may be realized.

Figure 4:
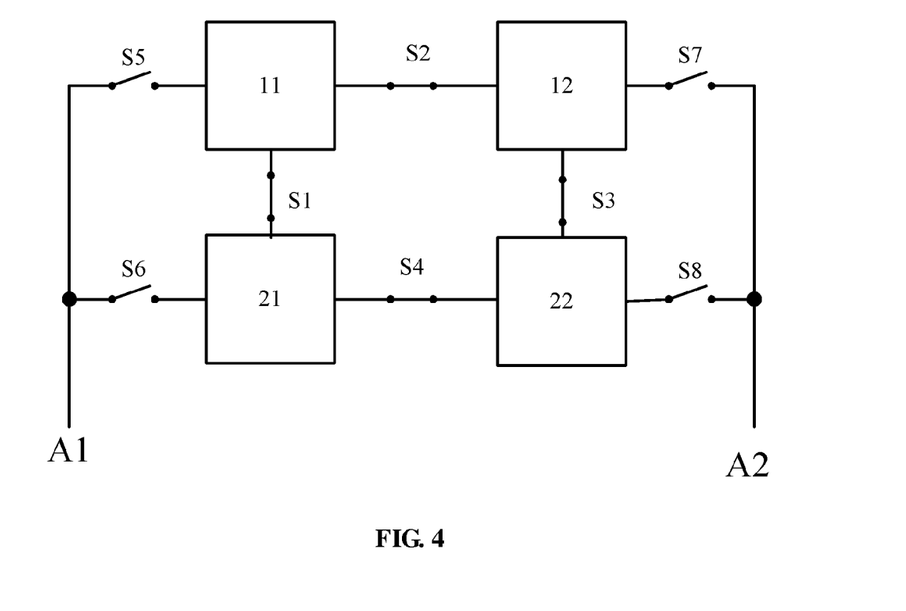
FIG. 4 schematically illustrates a diagram of the array substrate in FIG. 2*b* when the array substrate is in a display state.

FIG. 4 schematically illustrates a diagram of the array substrate in FIG. 2b when the array substrate is in a display state.

When the array substrate is in the display state, the first control module is configured to: turn on the first switches; and turn off the second switches, such that the signal lines can transmit the display data.

Referring to FIG. 4, the first switches S1 to S4 are turned on, and the four touch control electrodes arranged in array are electrically connected. Thus, a display function may be achieved.

As touch control detection is not required in the display state, the second switches S5 to S8 may be turned off, thus, the touch control electrodes are disconnected from the signal lines A1 and A2.

From above, either in the touch control detection state or in the display state, the signal lines are connected with TFTs in corresponding sub pixels. Detailed connection relations can be found in an equivalent circuit diagram illustrated in FIG. 5.

Figure 5:
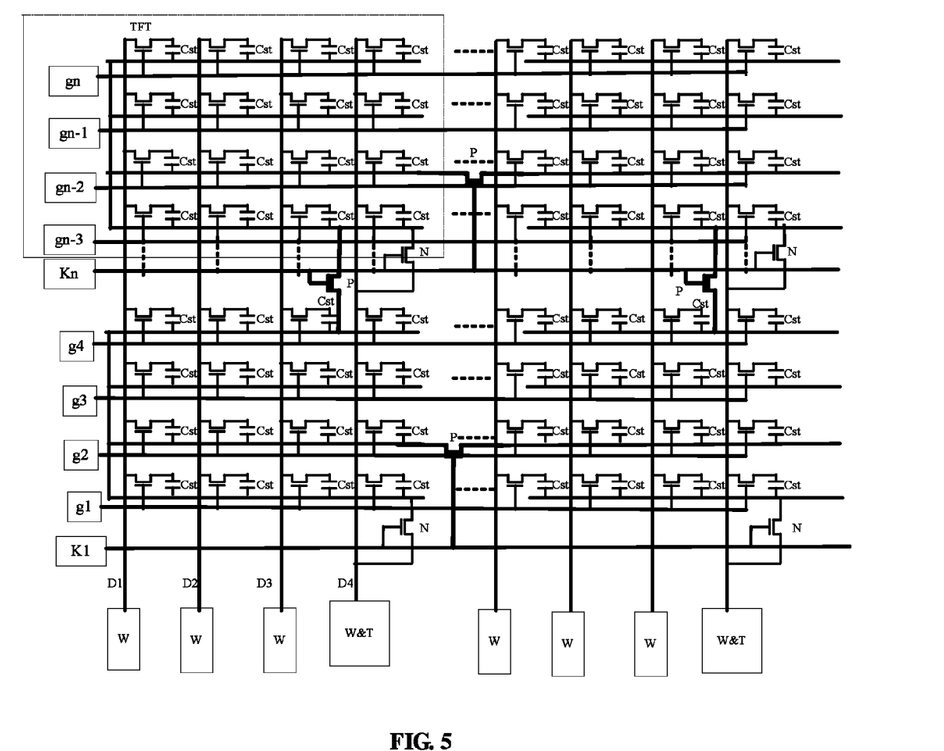
FIG. 5 schematically illustrates an equivalent circuit diagram of an array substrate according to an embodiment of the present disclosure.

Each touch control electrode includes a plurality of pixel electrodes, and each sub pixel electrode is connected with a corresponding TFT. Referring to FIG. 5, the TFTs corresponding to the sub pixels in the first column are connected to the first signal line D1, the TFTs corresponding to the sub pixels in the second column are connected to the second signal line D2, the TFTs corresponding to the sub pixels in the third column are connected to the third signal line D3, and the TFTs corresponding to the sub pixels in the fourth column are connected to the fourth signal line D4.

Figure 5A:
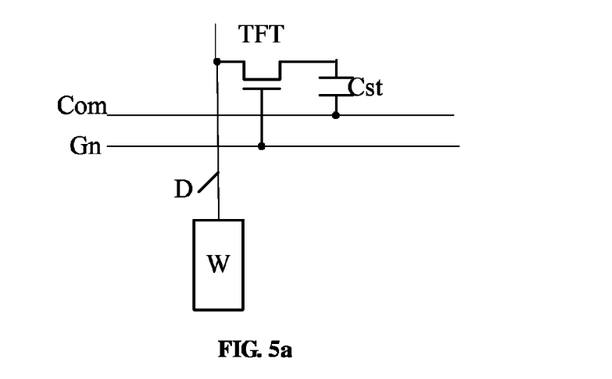
FIG. 5*a* schematically illustrates an enlarged circuit diagram of a pixel electrode according to an embodiment of the present disclosure.

FIG. 5a schematically illustrates an enlarged circuit diagram of a pixel electrode in FIG. 5. Drains or sources of TFTs in the sub pixels in a same column are connected with a same signal line D, gates of TFTs in the sub pixels in a same row are connected with a same gate line Gn, and capacitances Cst in the sub pixels in a same row are connected with a common electric potential Com.

Referring to FIG. 5, in some embodiments, each signal line is connected to a data signal input terminal W located in the non-display region. And each touch control electrode is connected to a touch control detection terminal T located in the non-display region, which is through one of the signal lines.

In some embodiments, one touch control electrode may include a plurality of signal lines (for example, D1 to D4 in FIG. 5), but one touch control detection terminal is connected to only one signal line (for example, W&T is connected to the fourth signal line D4 in FIG. 5).

In some embodiments, the data signal input terminal and the touch control detection terminal can share one terminal or be set independently. For example, only one terminal is set for serving as both the data signal input terminal and the touch control detection terminal (as illustrated in FIG. 5, the terminal is designated by "W&T"). When the array substrate is in the display state, the one terminal as the data signal input terminal is configured to transmit display data to the display panel. When the array substrate is in the touch control detection state, the one terminal as the touch control detection terminal is configured to detect a touched region.

In FIG. 5, g1 to gn represent impulse signals for turning on or turning off the TFTs in the pixel electrodes.

K1 to Kn generated by the first control module are impulse drive signals corresponding to the touch control electrodes in M rows, respectively. K1 to Kn are connected with control terminals of the first switches and the second switches, and configured to turn on or turn off the first switches and the second switches.

In some embodiments, the first switches may be P-type transistors, such as Positive Channel Metal Oxide Semiconductor (PMOS) transistors, and the second switches may be N-type transistors, such as Negative Channel Metal Oxide Semiconductor (NMOS) transistors.

In some embodiments, the first switches are in a different state with the second switches. Namely, when the first switches are turned on, the second switches are turned off. Therefore, when the first switches have a different conductive type with the second switches, the first switches and the second switches in a same row may be driven by a same impulse drive signal. Referring to FIG. 5, the PMOS transistors and the NMOS transistors in a same row are connected with a same impulse drive signal. Working principles under this situation will be described in detail below.

Figure 6:
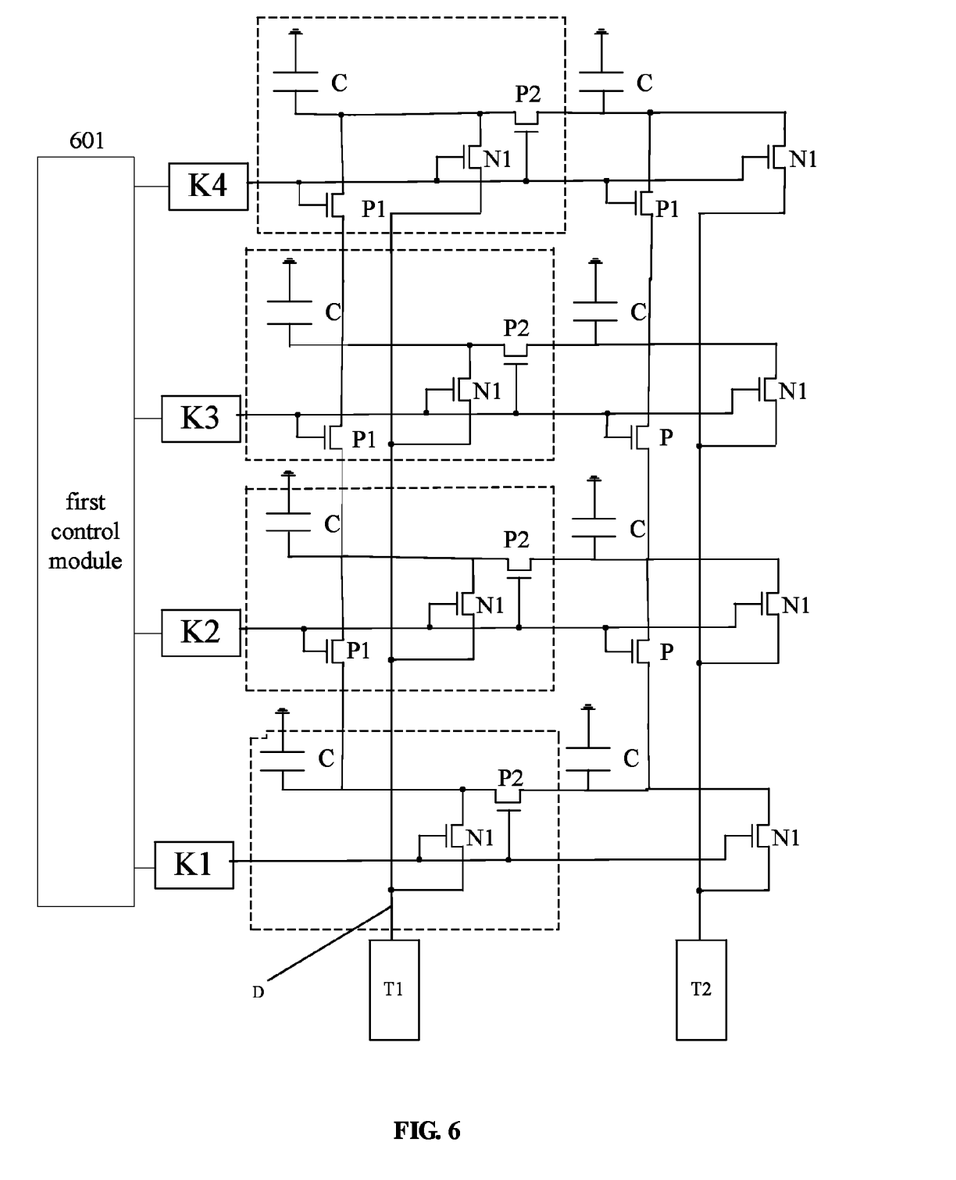
FIG. 6 schematically illustrates an equivalent circuit diagram of an array substrate according to an embodiment of the present disclosure.

Referring to FIG. 6, FIG. 6 schematically illustrates an equivalent circuit diagram of an array substrate according to an embodiment of the present disclosure.

In some embodiments, the array substrate includes a plurality of first switches and a plurality of second switches. The plurality of first switches may include a first type of switch transistors, and the plurality of second switches may include a second type of switch transistors.

In some embodiments, the first type of switch transistors may be PMOS transistors, and the second type of switch transistors may be NMOS transistors.

The array substrate may further include a first control module 601, configured to generate M impulse drive signals, where M is the row number of touch control electrodes. The M impulse drive signals are connected with gates of the NMOS transistors and the PMOS transistors, and configured to turn on or turn off the NMOS transistors and the PMOS transistors.

In FIG. 6, four rows of touch control electrodes are illustrated for example, the four rows corresponding to four impulse drive signals K1 to K4, respectively.

In some embodiments, the M impulse drive signals have the same duty cycles and periods.

In some embodiments, a gate of a PMOS transistor between touch control electrodes in a particular row and in an adjacent row, a gate of a PMOS transistor between each two adjacent touch control electrodes in the particular row, and a gate of a NMOS transistor connected with a signal line in the particular row are connected to a same impulse drive signal.

When the array substrate is in a touch control detection state, the duration of high electric potentials of impulse drive signals corresponding to each two adjacent touch control electrodes may be overlapped partially, such that each touch control electrode can be performed with touch control detection independently. When the impulse drive signal corresponding to the touch control electrodes is at a low electric potential, the touch control electrodes are connected to a reference electric potential, which is generally a common electric potential of the array substrate.

In FIG. 6, the equivalent circuit diagram of the array substrate is illustrated with touch control electrodes arranged in four rows and two columns The touch control electrodes in the first column are marked with dotted boxes.

Figure 7:
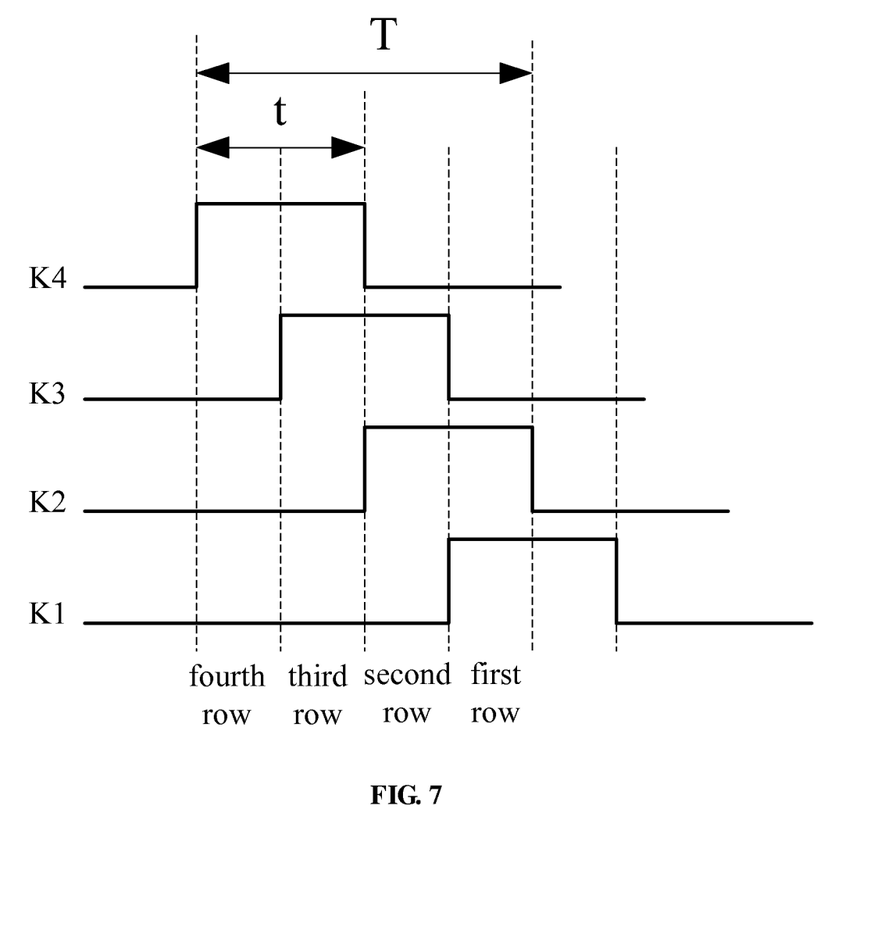
FIG. 7 schematically illustrates a time sequence diagram of impulse drive signals in FIG. 6.

FIG. 7 schematically illustrates a time sequence diagram of impulse drive signals connected with the PMOS transistors and the NMOS transistors in FIG. 6.

Working principles of the array substrate are described in conjunction with FIGS. 6 and 7 below.

The two columns of touch control electrodes are corresponding to two touch control detection terminals T1 and T2, respectively. From bottom to up, a first row, a second row, a third row and a fourth row of touch control electrodes are illustrated. The impulse drive signals corresponding to the four rows are K1 to K4, respectively. When the impulse drive signal connected with the gate of the PMOS transistor is at a high electric potential, the PMOS transistor is in an off-state; and vice versa. When the impulse drive signal connected with the gate of the NMOS transistor is at a low electric potential, the NMOS transistor is in an off-state; and vice versa.

To be brief, the PMOS transistors between two adjacent touch control electrodes in a same column are represented by P1, the PMOS transistors between two adjacent touch control electrodes in a same row are represented by P2, and the NMOS transistors between the touch control electrodes and the signal lines D are represented by N1.

Take the fourth row for example. In the duration of the high electric potential of the impulse drive signal K4 which corresponds to the four row, the PMOS transistor P1 between the touch control electrodes in the fourth row and those in the third row is turned off, the PMOS transistor P2 between the touch control electrode in the fourth row and the first column and the touch control electrode in the fourth row and the second column is turned off as well, and the NMOS transistor N1 corresponding to the touch control electrode in the fourth row and the first column is turned on. In this way, the common electric potential in the fourth row may be independent, the capacitance C and the signal line D are connected through the NMOS transistor N1, and this helps the touch control detection terminal T1 to perform touch control detection to the touch control electrode in the fourth row and the first column.

The touch control electrodes in other columns in the fourth row may be detected similarly, which is not described in detail here.

When high electric potentials of the impulse drive signals K4 and K3 are partially overlapped, the touch control electrodes in the third row are disconnected from those in the fourth row and those in the second row, each two adjacent touch control electrodes in the third row are disconnected as well, and in the third row, the capacitance C is connected with the signal line by the NMOS transistor N1. In this way, the touch control detection terminal T1 realizes touch control detection to the touch control electrodes in the third row and the first column Similarly, the touch control detection is performed row by row, such that all the touch control electrodes experience the touch control detection.

When the impulse drive signal corresponding to the touch control electrode is at a low electric potential, the touch control electrode is connected to a reference electric potential, which is generally a common electric potential of the array substrate. The touch control electrode is in a display retaining state. For example, referring to FIG. 7, when the impulse drive signal K4 is at a low electric potential, the PMOS transistors P1 and P2 corresponding to the touch control electrodes in the first row are turned on, that is, all the touch control electrodes in the first row are connected with the common electric potential, which leads to a display retaining state. The NMOS transistors N1 corresponding to the touch control electrodes in the first row are in an off-state, such that touch control detection may not be performed to the touch control electrodes in the first row. When the impulse drive signal K1, K2 or K3 is at a low electric potential, situations may be similar, and are not described in detail here.

In some embodiments, an overlapped time period of durations of high electric potentials may be ⅓ to ⅔ of the duration of high electric potential. The detailed ratio may be set according to practical requirements. Referring to FIG. 7, a period of the impulse drive signal is T, and the overlapped time period of two pulse drive signals is half of the period.

In some embodiments, a duty cycle of the impulse drive signals may be the same. Referring to FIG. 7, the duty cycle is ½, namely, t=T*(½). It should be noted that, the value of the duty cycle is determined according to practical requirements, and is not limited in the embodiments of the present disclosure.

In the above embodiments shown in FIGS. 6 and 7, the first type of switch transistors are PMOS transistors and the second type of switch transistors are NMOS transistors. In some embodiments, the first type of switch transistors are NMOS transistors and the second type of switch transistors are PMOS transistors. The first control module is configured to generate M impulse drive signals, where M is the row number of touch control electrodes. In some embodiments, the M impulse drive signals have same duty cycle and period. In some embodiments, a gate of a NMOS transistor between touch control electrodes in a particular row and in an adjacent row, a gate of a NMOS transistor between each two adjacent touch control electrodes in the particular row, and a gate of a PMOS transistor connected with a signal line in the particular row are connected to a same impulse drive signal.

When the first type of switch transistors are NMOS transistors and the second type of switch transistors are PMOS transistors, the high electric potentials and the low electric potentials of the impulse drive signals in FIG. 7 may be exchanged. To perform touch control detection, the NMOS transistors may be turned off and the PMOS transistors may be turned on.

Figure 9:
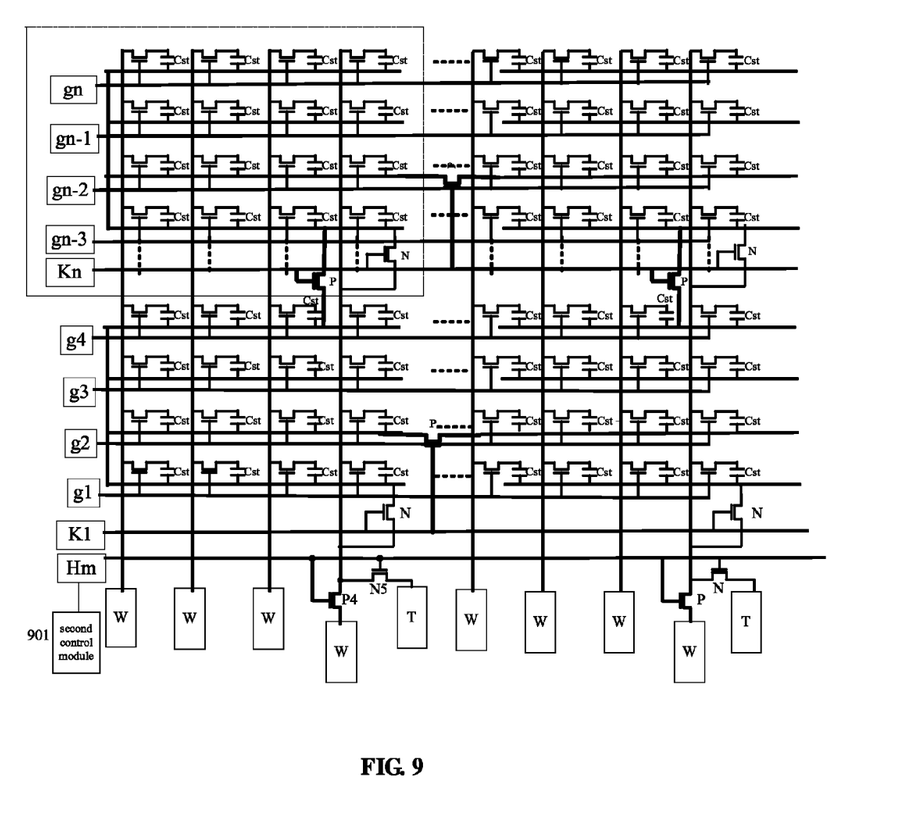
FIG. 9 schematically illustrates an equivalent circuit diagram of an array substrate according to an embodiment of the present disclosure.

FIG. 9 schematically illustrates an equivalent circuit diagram of an array substrate according to an embodiment of the present disclosure.

The array substrate includes touch control detection terminals T and data input terminals W in a non-display region. In some embodiments, the touch control detection terminal T and the data input terminal W may use one terminal commonly, such as T&W shown in FIG. 5. The signal line D4 is connected with the multiplexed terminal T&W.

Figure 8:
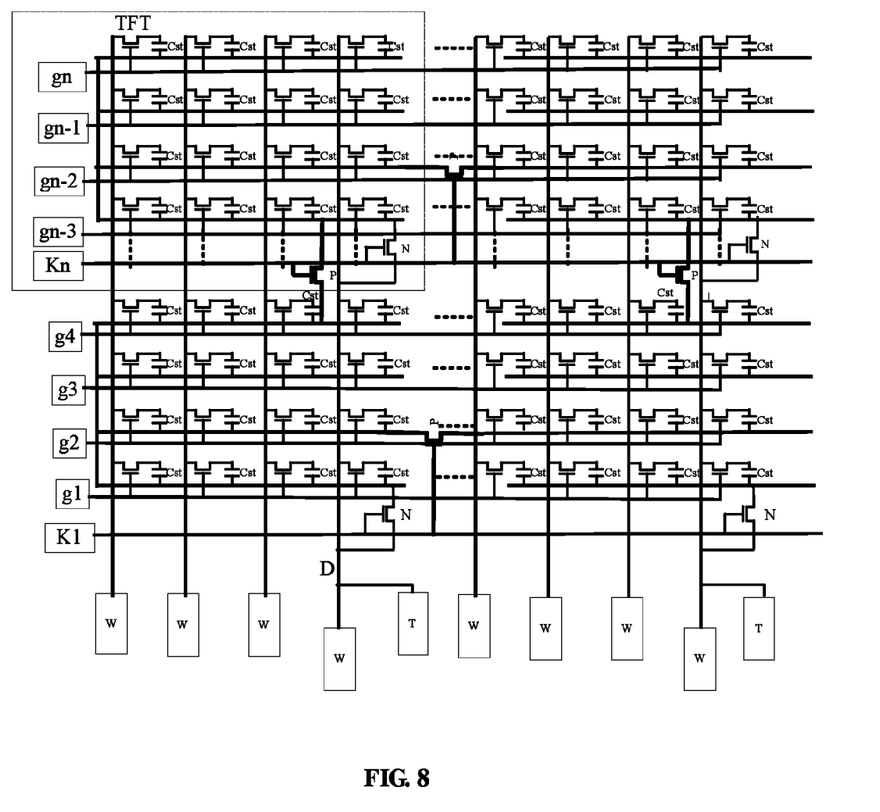
FIG. 8 schematically illustrates an equivalent circuit diagram of an array substrate according to an embodiment of the present disclosure.

Referring to FIG. 8, in some embodiments, the touch control detection terminals T and the data input terminals W may be set independently. The signal line D is connected with both the touch control detection terminal T and the data input terminal W.

When the touch control detection terminals T and the data input terminals W are set independently, to avoid or reduce interference between the touch control detection terminals T and the data input terminals W, two switch transistors are added in each column of touch control electrodes. Working principles of the array substrate are described in detail below in conjunction with FIG. 9.

The array substrate further includes a second control module 901, fourth switch transistors P4 and fifth switch transistors N5. In some embodiments, the fourth switch transistors P4 are PMOS transistors and the fifth switch transistors N5 are NMOS transistors.

Each touch control detection terminal T corresponds to one fourth switch transistor P4 and one fifth switch transistor N5. A first terminal of a fourth switch transistor P4 is connected with a signal line, a second terminal of the fourth switch transistor P4 is connected with a data input terminal W, a first terminal of a fifth switch transistor N5 is connected with the first terminal of the fourth switch transistor P4, and a second terminal of the fifth switch transistor N5 is connected with a touch control detection terminal T. A third terminal (i.e., a control terminal) of the fourth switch transistor P4 and a third terminal (i.e., a control terminal) of the fifth switch transistor N5 are connected with the second control module 901.

The second control module 901 is configured to generate an impulse drive signal Hm. The impulse drive signal Hm is connected with the control terminals of the fourth switch transistor P4 and the fifth switch transistor N5, and configured to turn on or turn off the fourth switch transistor P4 and the fifth switch transistor N5.

When the array substrate is in a display state, the second control module 901 is configured to turn on the fourth switch transistor P4 and turn off the fifth switch transistor N5. The impulse drive signal Hm is at a low electric potential.

When the array substrate is in a display retaining state or a touch control detection state, the second control module 901 is configured to turn off the fourth switch transistor P4 and turn on the fifth switch transistor N5. The impulse drive signal Hm is at a high electric potential.

It is well known that PMOS transistors and NMOS transistors have different conductive types. When the fourth switch transistors are PMOS transistors and the fifth switch transistors are NMOS transistors, or, the fourth switch transistors are NMOS transistors and the fifth switch transistors are PMOS transistors, their gates may be driven by a same impulse drive signal. For example, the impulse drive signal Hm is used in FIG. 9. In this way, the signal line is only electrically connected with the touch control detection terminal T or the data input terminal W. For example, when the array substrate is in the display state, the impulse drive signal Hm is at a low electric potential; and when the array substrate is in the touch control detection state, the impulse drive signal Hm is at a high electric potential.

In some embodiments, the fourth switch transistors P4 and the fifth switch transistors N5 may have a same conductive type. To make one of two switch transistors which have the same conductive type in an on-state and the other in an off-state at a same time, gates of the two switch transistors need to be connected to two pulse drive signals respectively, where the difference between phases of the two pulse drive signals is 180°, that is, one pulse drive signal is a high electric potential and the other is a low electric potential.

In the above embodiments, when the touch control detection terminals T and the data input terminals W are set independently, two switch transistors are used, to enable the touch control detection terminals T and the data input terminals W to share one signal line and to avoid interference between the touch control detection terminals T and the data input terminals W.

In some embodiments, the array substrate may further include a plurality of common electrode units, wherein one common electrode unit and one touch control electrode are multiplexed onto one electrode.

In an embodiment, a display panel is provided including any one of the above-mentioned array substrates.

Figure 10:
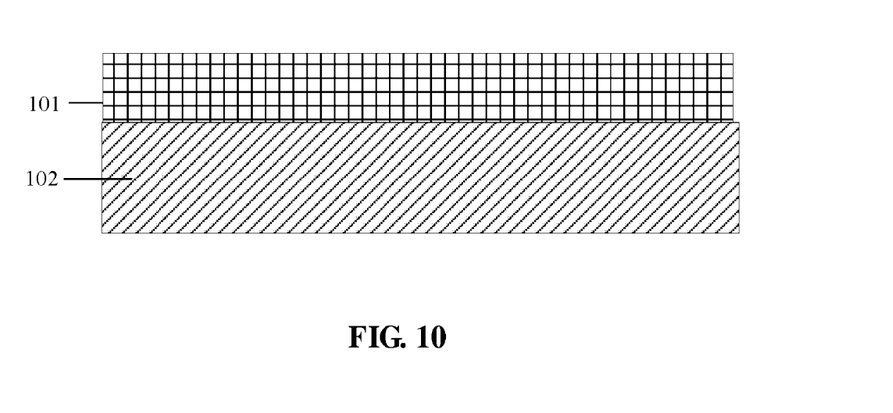
FIG. 10 schematically illustrates a diagram of a display panel according to an embodiment of the present disclosure.

Referring to FIG. 10, an array substrate 101 is disposed on a substrate 102.

In an embodiment, an electronic device is provided including any one of the above-mentioned display panels.

Figure 11:
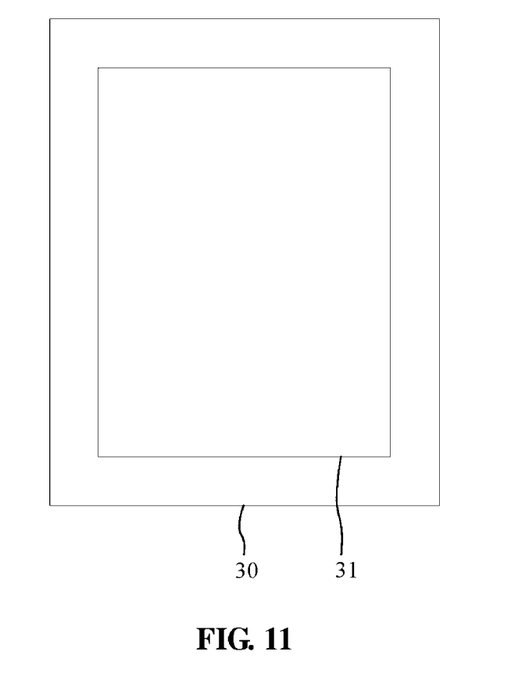
FIG. 11 schematically illustrates a diagram of an electronic device according to an embodiment of the present disclosure.

Referring to FIG. 11, the electronic device 30 includes a display panel 31. In some embodiments, the electronic device 30 may further include a drive circuit and other components for supporting the electronic device 30 in normally operating.

The display panel 31 is any one of the above-mentioned display panels. The electronic device 30 may be a mobile phone, a desktop computer, a laptop, a pad or an electronic paper.

Although the present disclosure has been disclosed above with reference to preferred embodiments thereof, it should be understood that the disclosure is presented by way of example only, and not limitation. Those skilled in the art can modify and vary the embodiments without departing from the scope of the present disclosure. Therefore, the protection scope of the present disclosure is subject to the scope defined by the claims.

What is claimed is:

1. An array substrate, comprising:
a touch control circuit, comprising:
a plurality of touch control electrodes configured in an array of columns and rows insulated from each other;
a first touch control module comprising a plurality of impulse drive signal lines, wherein each of the plurality of impulse drive signal lines is associated to one row of the touch control electrodes;
a plurality of data signal lines;
a plurality of first TFT switches each comprising a gate electrode, a first electrode and a second electrode, wherein the gate electrode of each of the first TFT switches is connected to one of the impulse drive signal lines, wherein the first electrode and the second electrode of each of the first TFT switches are connected to two adjacent touch control electrodes respectively; and
a plurality of second TFT switches each comprising a gate electrode, a first electrode and a second electrode, wherein the gate electrode of each of the second TFT switches is connected to one of the impulse drive signal lines, wherein the first electrode and the second electrode of each of the second TFT switches are connected to one of the plurality of touch control electrodes and one of the plurality of the data signal lines respectively;
wherein, when the array substrate is in a touch control detection state, an impulse signal is sent to a row from one of the associated impulse drive signal lines to:
turn off the plurality of first TFT switches to disconnect all the adjacent touch control electrodes connected by the first TFT switches on the said row, and
turn on the plurality of second TFT switches to connect the touch control electrodes to the associated data signal lines.

2. The array substrate according to claim 1, wherein when the array substrate is in a display state, the first control module is configured to: turn on all the plurality of first TFT switches; and turn off all the plurality of second TFT switches, such that the data signal lines are capable of transmitting display data.

3. The array substrate according to claim 1, wherein the plurality of first TFT switches and the plurality of second TFT switches comprise the same type of conductive transistors.

4. The array substrate according to claim 1, wherein the plurality of first TFT switches comprise a first type of switch transistors, and the plurality of second TFT switches comprise a second type of switch transistors, wherein the first and second types of switch transistors are opposite conductive transistors.

5. The array substrate according to claim 4, wherein the first type of switch transistors are Positive Channel Metal Oxide Semiconductor (PMOS) transistors, and the second type of switch transistors are Negative Channel Metal Oxide Semiconductor (NMOS) transistors.

6. The array substrate according to claim 5, wherein the first control module is further configured to generate M impulse drive signals, wherein M is the number of rows of the touch control electrodes, the M impulse drive signals have same duty cycle and period, and a gate of a PMOS transistor between touch control electrodes in a first row and in an adjacent row, a gate of a PMOS transistor between each two adjacent touch control electrodes in the first row, and a gate of a NMOS transistor connected with the data signal line in the first row are connected to a same impulse drive signal.

7. The array substrate according to claim 6, wherein when the array substrate is in a touch control detection state, the durations of high electric potentials of impulse drive signals corresponding to each two adjacent touch control electrodes are overlapped partially, such that each touch control electrode is performed with touch control detection independently.

8. The array substrate according to claim 7, wherein when the impulse drive signal corresponding to the touch control electrode is at a low electric potential, the touch control electrode is connected to a reference electric potential.

9. The array substrate according to claim 8, wherein the reference electric potential is generally a common electric potential of the array substrate.

10. The array substrate according to claim 4, wherein the first type of switch transistors are NMOS transistors, and the second type of switch transistors are PMOS transistors.

11. The array substrate according to claim 10, wherein the first control module is further configured to generate M impulse drive signals, wherein M is the number of rows of the touch control electrodes, the M impulse drive signals have same duty cycle and period, and a gate of a NMOS transistor between touch control electrodes in a first row and in an adjacent row, a gate of a NMOS transistor between each two adjacent touch control electrodes in the first row, and a gate of a PMOS transistor connected with the data signal line in the first row are connected to a same impulse drive signal.

12. The array substrate according to claim 11, wherein when the array substrate is in a touch control detection state, the durations of high electric potentials of impulse drive signals corresponding to each two adjacent touch control electrodes are overlapped partially, such that each touch control electrode is performed with touch control detection independently.

13. The array substrate according to claim 12, wherein when the impulse drive signal corresponding to the touch control electrode is at a low electric potential, the touch control electrode is connected to a reference electric potential.

14. The array substrate according to claim 13, wherein the reference electric potential is generally a common electric potential of the array substrate.

15. The array substrate according to claim 1, further comprising a touch control detection terminal and a data input terminal in a non-display region, wherein the touch control detection terminal and the data input terminal are multiplexed onto one terminal, and the signal line is connected with the touch control detection terminal and the data input terminal.

16. The array substrate according to claim 1, further comprising a touch control detection terminal and a data input terminal in a non-display region, wherein the touch control detection terminal and the data input terminal are set independently, and the data signal line is connected with the touch control detection terminal and the data input terminal.

17. The array substrate according to claim 16, further comprising: a second control module, fourth switch transistors and fifth switch transistors in the non-display region,
wherein each touch control detection terminal corresponds to one fourth switch transistor and one fifth switch transistor, a first terminal of the fourth switch transistor is connected with the data signal line, a second terminal of the fourth switch transistor is connected with the data input terminal, a first terminal of the fifth switch transistor is connected with the first terminal of the fourth switch transistor, and a second terminal of the fifth switch transistor is connected with the touch control detection terminal, and a third terminal of the fourth switch transistor and a third terminal of the fifth switch transistor are connected with the second control module,
wherein when the array substrate is in a display state, the second control module is configured to turn on the fourth switch transistor and turn off the fifth switch transistor; and when the array substrate is in a display retaining state or a touch control detection state, the second control module is configured to turn off the fourth switch transistor and turn on the fifth switch transistor.

18. The array substrate according to claim 1, further comprising a plurality of common electrode units, wherein one common electrode unit and one touch control electrode are multiplexed onto one electrode.

19. A display panel, comprising the array substrate according to claim 1.

20. An array substrate, comprising,
an array having rows and columns;
a touch control circuit comprising:
    a plurality of first switches;
    a plurality of second switches;
    a first control module; and
a plurality of touch control electrodes, arranged in the array and insulated from one another, wherein every two adjacent touch control electrodes are connected to one another via a first switch and each touch control electrode is connected to a signal line via a second switch;
wherein when the array substrate is in a touch control detection state, the first control module associated with each row of the array is configured to:
turn off the first switches connecting every two adjacent touch control electrodes in a first row,
turn on the second switches in the first row, such that each touch control electrode in the first row are disconnected from adjacent touch control electrodes in the first row of the array substrate, and each touch control electrode in the first row is electrically connected to a signal line;
wherein the plurality of first switches comprises a first type of switch transistors, and the plurality of second switches comprise a second type of switch transistors, wherein the first and second type of switch transistors are opposite conductive transistors;
wherein the first type of switch transistors are Positive Channel Metal Oxide Semiconductor (PMOS) transistors, and the second type of switch transistors are Negative Channel Metal Oxide Semiconductor (NMOS) transistors; and
wherein the first control module is further configured to generate M impulse drive signals, wherein M is the number of rows of the touch control electrodes, the M impulse drive signals have same duty cycle and period, and a gate of a PMOS transistor between touch control electrodes in a first row and in an adjacent row, a gate of a PMOS transistor between each two adjacent touch control electrodes in the first row, and a gate of a NMOS transistor connected with the signal line in the first row are connected to a same impulse drive signal.

* * * * *